(12) United States Patent
Yerushalmi

(10) Patent No.: US 6,395,221 B1
(45) Date of Patent: *May 28, 2002

(54) TILTING ROTARY FURNACE SYSTEM FOR RECOVERY OF NON-FERROUS METALS FROM SCRAP OR DROSS AND METHOD OF OPERATION

(75) Inventor: Moshe Yerushalmi, Cleveland, OH (US)

(73) Assignee: MDY Engineering Corp., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/533,097

(22) Filed: Mar. 23, 2000

(51) Int. Cl.[7] ............................................... C21D 11/00
(52) U.S. Cl. ............................ 266/91; 266/90; 266/213
(58) Field of Search ................................ 266/200, 213, 266/90, 91; 432/250

(56) References Cited

U.S. PATENT DOCUMENTS

| | | |
|---|---|---|
| 1,708,403 A | * 4/1929 | Tharaldsen .................. 266/213 |
| 5,145,361 A | 9/1992 | Kurzinski |
| 5,158,737 A | 10/1992 | Stein |
| 5,299,933 A | 4/1994 | Mosci |
| 5,460,518 A | 10/1995 | Mosci |
| 5,527,380 A | 6/1996 | Gripenberg et al. |
| 5,540,752 A | 7/1996 | Spoel |
| 5,616,023 A | 4/1997 | Mosci |
| 5,749,722 A | 5/1998 | Driscoll et al. |

* cited by examiner

*Primary Examiner*—Scott Kastler
(74) *Attorney, Agent, or Firm*—Renner, Otto, Boisselle & Sklar, LLP

(57) ABSTRACT

A furnace system for recovering a non-ferrous metal from a charge of material containing the metal. The furnace system having a furnace chamber having walls defining a refractory chamber, the refractory chamber receiving the charge of material and the metal contained in the charge of material being heated into a flowable mode in the refractory chamber. The furnace system having at least one paddle radially projecting from an interior surface of the furnace chamber toward a longitudinal axis of the furnace chamber. Other features of the invention include a door having a closed position adjacent an inlet passage to the furnace chamber, the door having rollers and a suspension. Other features of the invention include a motor and a control unit which monitors torque to rotate the furnace chamber as an indication of viscosity of the charge of material. Methods of operating a furnace system for recovering non-ferrous metal from a charge of material containing the metal are also discussed.

12 Claims, 6 Drawing Sheets

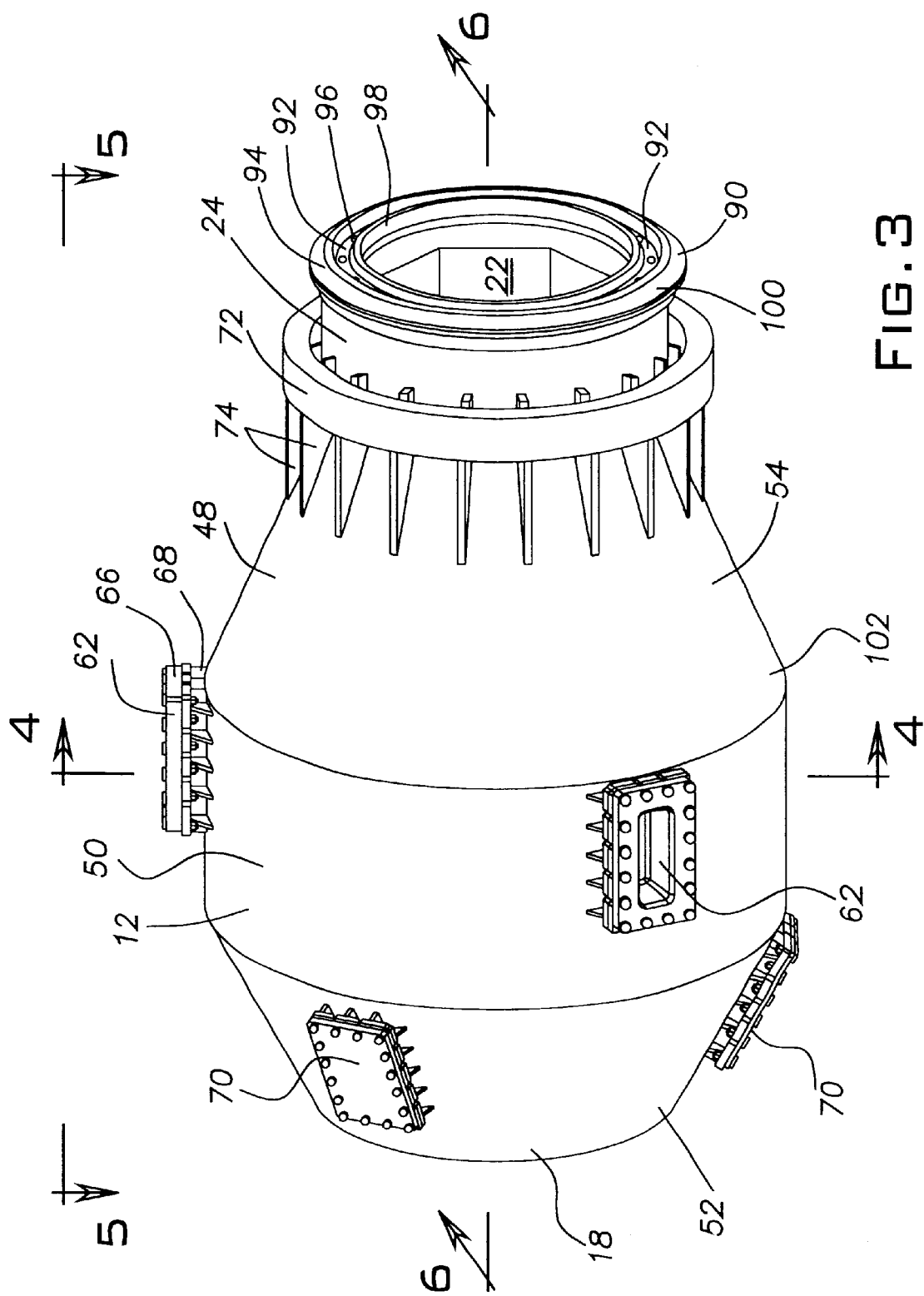

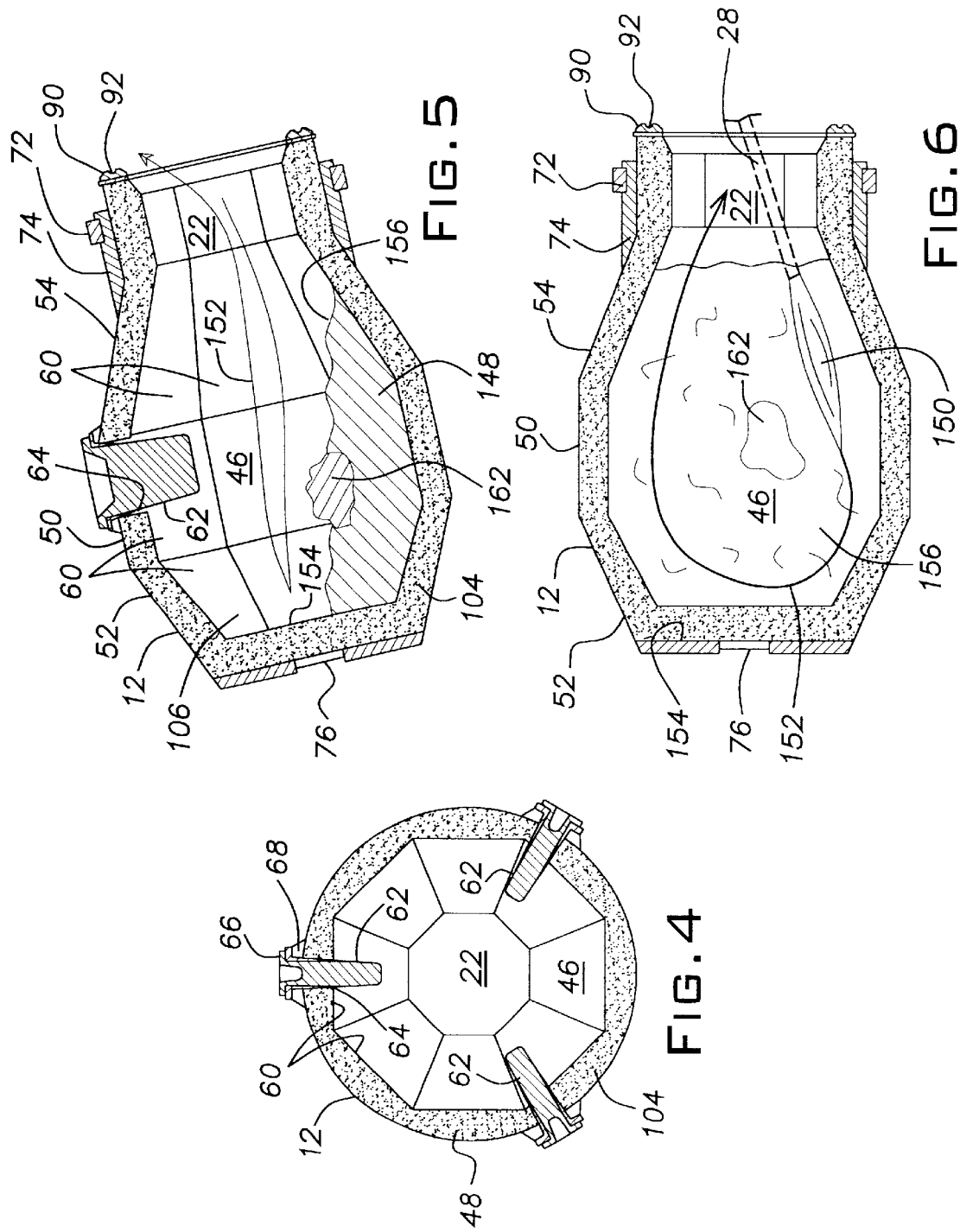

TILTING ROTARY FURNACE SYSTEM FOR RECOVERY OF NON-FERROUS METALS FROM SCRAP OR DROSS AND METHOD OF OPERATION

TECHNICAL FIELD

The present invention generally relates to rotary furnaces and, more particularly, to a tilting rotary furnace system used in the reclamation of non-ferrous metals from scrap or dross and a method of operating the furnace.

BACKGROUND ART

There is an ever present demand for recovering usable material, such as non-ferrous metals, from scrap and waste items. During the recovery process, there are additional demands to decrease the amount of resources, especially fuel, required to convert the items into usable material and to decease the amount of waste by-product generated by the recovery process.

To date, the process of recovering non-ferrous metals, such as aluminum from batches of scrap material or dross material, is fairly inefficient. Aluminum scrap is obtained from a number of sources, such as waste aluminum from manufacturing facilities, industrial scrap, used automobile parts such as engine blocks, beverage containers and the like. Dross containing aluminum is often obtained as a byproduct from a manufacturing facility which uses molten metals. It is noted that dross typically has a lower aluminum content than scrap. Dross, as used herein, means the solid scum that forms on the surface of a metal when molten or during melting and is largely the result of oxidation, due to conversion of aluminum fines (small particles) to aluminum oxide, but also includes aluminum, dirt and impurities that rise to the surface of the mixture. Dross also includes salt and/or flux used as part of the previous melting process which can be potassium chloride (KCl), sodium chloride (NaCl) or other salt such as NaF, NaBr, KF and FBr. Dross also includes waste or foreign matter mixed with a substance or what is left as a residue after the substance has been used or processed.

Examples of non-ferrous recovery metal devices can be found in U.S. Pat. Nos. 5,527,380 and 5,540,752. However, these examples have not generated proven, repeatable results. In addition, these and other devices making up the current state of the art with regard to aluminum recovery have slow throughput (i.e., melt rate) with a low recovery rate in terms of the weight of recovered metal versus the beginning weight of the scrap. The current recovery devices and methods have relatively high conversion costs and use a considerable amount of fuel (e.g., 65 m$^3$ of natural gas per metric ton of scrap and flux material). They also use a considerable amount of flux to retard oxidation. The current recovery devices and methods also generate a considerable amount of waste by-product in the form of slag (slat cake). The slag is generally not useful and requires disposal, which consumes valuable landfill space.

SUMMARY OF THE INVENTION

According to an aspect of the present invention, a furnace system for recovering a non-ferrous metal from a charge of material containing the metal, includes: a furnace chamber having walls defining a refractory chamber, the refractory chamber receiving the charge of material and the metal contained in the charge of material being heated into a flowable mode in the refractory chamber; and at least one paddle projecting from an interior surface of the furnace chamber toward an interior of the refractory chamber.

According to another aspect of the present invention, a furnace system for recovering a non-ferrous metal from a charge of material containing the metal, includes: a furnace chamber having walls defining a refractory chamber, the refractory chamber receiving the charge of material and the metal contained in the charge of material being heated into a flowable mode in the refractory chamber, the walls of the furnace chamber further defining an inlet passage to provide access to the refractory chamber; and a door having a closed position adjacent the inlet passage and an open position to provide access to the inlet passage, the door having a plurality of rollers engaging a rolling surface disposed on the furnace chamber adjacent the inlet passage, the door coupled to a support structure with a suspension, the rollers and suspension maintaining the door in a closed position during operation of the furnace system.

According to another aspect of the present invention, a furnace system for recovering a non-ferrous metal from a charge of material containing the metal, includes: a furnace chamber having walls defining a refractory chamber, the refractory chamber receiving the charge of material and the metal contained in the charge of material being heated to a flowable mode in the refractory chamber; a motor coupled to the furnace chamber and rotating the furnace chamber about a longitudinal axis; and a control unit, the control unit monitoring torque to rotate the furnace chamber as an indication of viscosity of the charge of material.

According to another aspect of the present invention, a method of operating a furnace system for recovering non-ferrous metal from a charge of material containing the metal, the furnace system having a furnace chamber defining a refractory chamber and an inlet passage for providing access to the refractory chamber, includes the steps of: charging the refractory chamber with at least one charge of material; rotating the furnace chamber; heating the charge of material into a flowable mode; and monitoring the viscosity of the charge of material by measuring torque to rotate the furnace chamber.

According to another aspect of the present invention, a method of operating a furnace system for recovering non-ferrous metal from a charge of material containing the metal, the furnace system having a furnace chamber defining a refractory chamber and an inlet passage for providing access to the refractory chamber, includes the steps of: charging the refractory chamber with an amount of charge material; rotating the furnace chamber; supplying heat energy to heat the charge of material into a flowable or near molten mode; and stopping the supply of heat energy after a predetermined amount of heat energy has been supplied, the predetermined amount of heat energy based on the amount of the charge of material.

According to another aspect of the present invention, a method of operating a furnace system for recovering non-ferrous metal from a charge of material containing the metal, the furnace system having a furnace chamber defining a refractory chamber and an inlet passage for providing access to the refractory chamber, includes the steps of: charging the refractory chamber with at least one charge of material; rotating the furnace chamber about a longitudinal axis of the furnace chamber; providing faceted surfaces on the interior of the interior furnace chamber to define the refractory chamber; and introducing heat energy into the refractory chamber at an angle to the longitudinal axis of the furnace chamber so that heat produced by the flame is reflected off of the faceted surfaces to provide a heat bath adjacent a top surface of the charge of material and heating the charge of material into a flowable mode.

According to another aspect of the present invention, a method of operating a furnace system for recovering non-ferrous metal from a charge of material containing the metal, the furnace system having a furnace chamber defining a refractory chamber and an inlet passage for providing access to the refractory chamber, includes the steps of: charging the refractory chamber with at least one charge of material; rotating the furnace chamber about a longitudinal axis of the furnace chamber; heating the charge of material into a flowable mode; and providing at least one paddle projecting from an interior surface of the furnace chamber towards an interior of the refractory chamber, the at least one paddle effective to break up and submerge the at least a portion of a portion of a slag material formed on a top surface of the charge of material.

BRIEF DESCRIPTION OF DRAWINGS

These and further features of the present invention will be apparent with reference to the following description and drawings, wherein:

FIG. 3 is a perspective view of a furnace chamber;

FIG. 4 is a cross-section view of an unloaded furnace chamber taken along the line 4—4 in FIG. 3;

FIG. 5 is a cross-section view of a loaded furnace chamber taken along the line 5—5 in FIG. 3;

FIG. 6 is a cross-section view of a loaded furnace chamber taken along the line 6—6 in FIG. 3;

DISCLOSURE OF INVENTION

Figure 1:
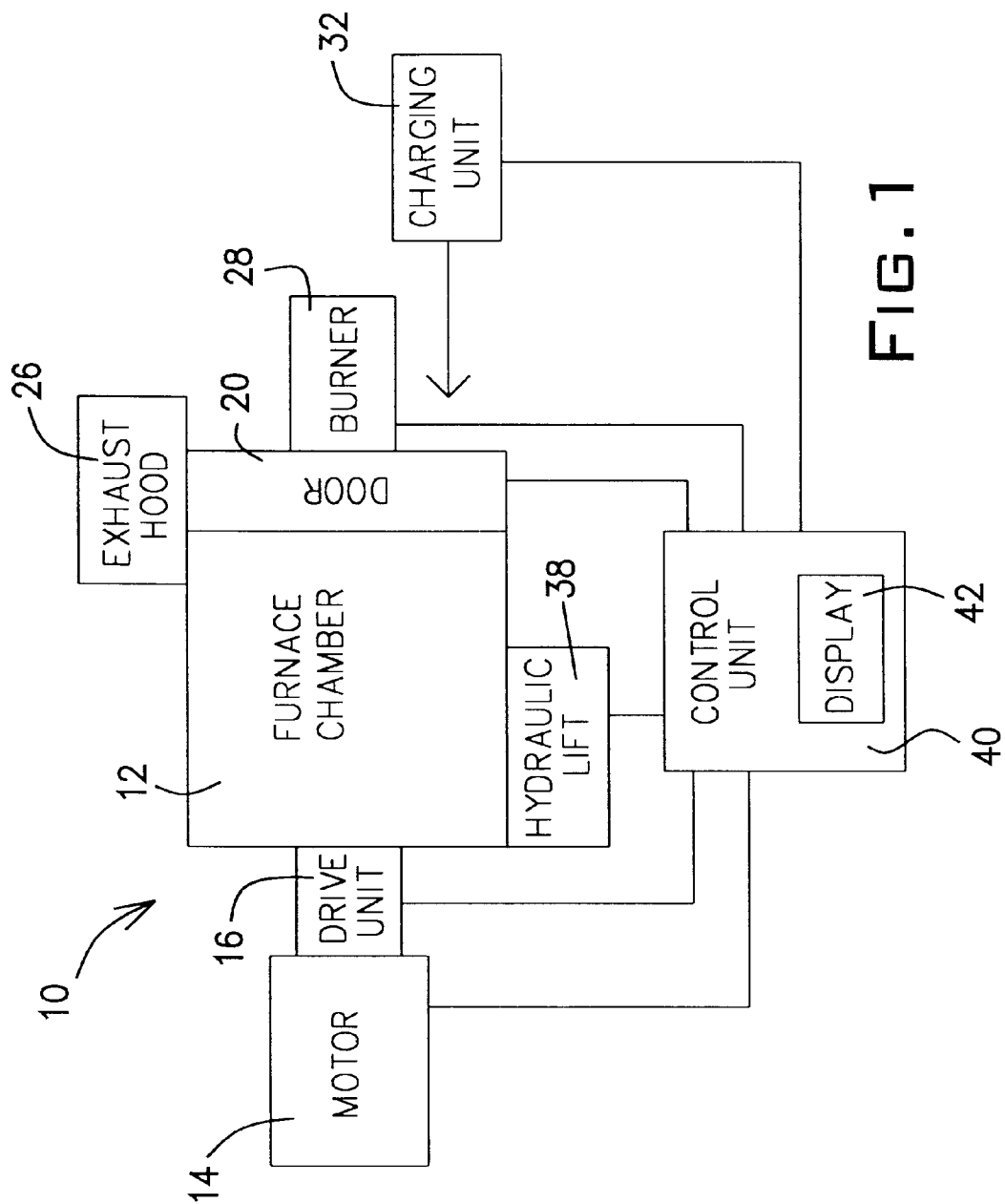
FIG. 1 is a block diagram of a tilting rotary furnace system according to the present invention.

In the detailed description which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

Introduction

The present invention is a tilting rotary furnace system for processing non-ferrous metals. More specifically, the non-ferrous metal is recovered from scrap material containing the desired metal or from dross material obtained from some other industrial process. In general, the scrap or dross containing the metal along with flux material is charged, in batches, into the furnace system and melted to separate and recover the desired metal. Dross, as used herein, means the solid scum that forms on the surface of a metal when molten or during melting and is largely the result of oxidation but also includes rising dirt and impurities to the surface of the mixture. Dross also includes a mixture of salt, flux and waste or foreign matter mixed with a substance or what is left as a residue after the substance has been used or processed.

A common non-ferrous metal which is recoverable using the present furnace system is aluminum or aluminum alloys, which will be referred to collectively as aluminum. The recovery of aluminum will serve as the basis for the discussion herein, but it should be understood that the present furnace system is not limited to processing aluminum. Scrap containing aluminum is obtained from any number of sources, such as waste aluminum from manufacturing facilities, industrial scrap, used automobile parts such as engine blocks, beverage containers and the like. The aluminum scrap that can be processed in the furnace system may be oily and/or painted. In addition, the aluminum scrap may contain impurities and may be mixed with pieces of material made from other types of metals, including ferrous metals. For example, aluminum engine blocks may contain steel piston rings and iron piston heads. Dross containing aluminum is often obtained as a by-product from a manufacturing facility which uses molten metals or obtained from slag resulting from an earlier recovery of aluminum.

In general, the furnace system is operated as follows. A furnace chamber is loaded with a first charge of material which includes aluminum scrap (or dross) and optionally includes flux in the form of a material such as salt (e.g., NaCl, KCl or a combination thereof). The flux is used to reduce oxidation of the aluminum during the melting cycle. The furnace is rotated and heated so that the aluminum becomes flowable or in a near molten state. The furnace chamber is then loaded with a second charge of aluminum scrap (or dross) and flux, then rotated and heated a second time until the charge material in the furnace chamber is flowable or in a near molten state. This process of charging and melting is repeated a third time. Once the charge material is sufficiently flowable, or molten, after the third charging and heating, the aluminum is poured from the furnace chamber into a recovery container where it cools naturally and becomes solid. After the aluminum is poured from the furnace chamber, the remaining material, or slag, is poured out of the furnace chamber into a waste container. One skilled in the art will appreciate that the second and third charges may be omitted and/or additional charges may be added to the process of recovering aluminum from aluminum scrap (or dross).

Furnace Apparatus

Figure 2:
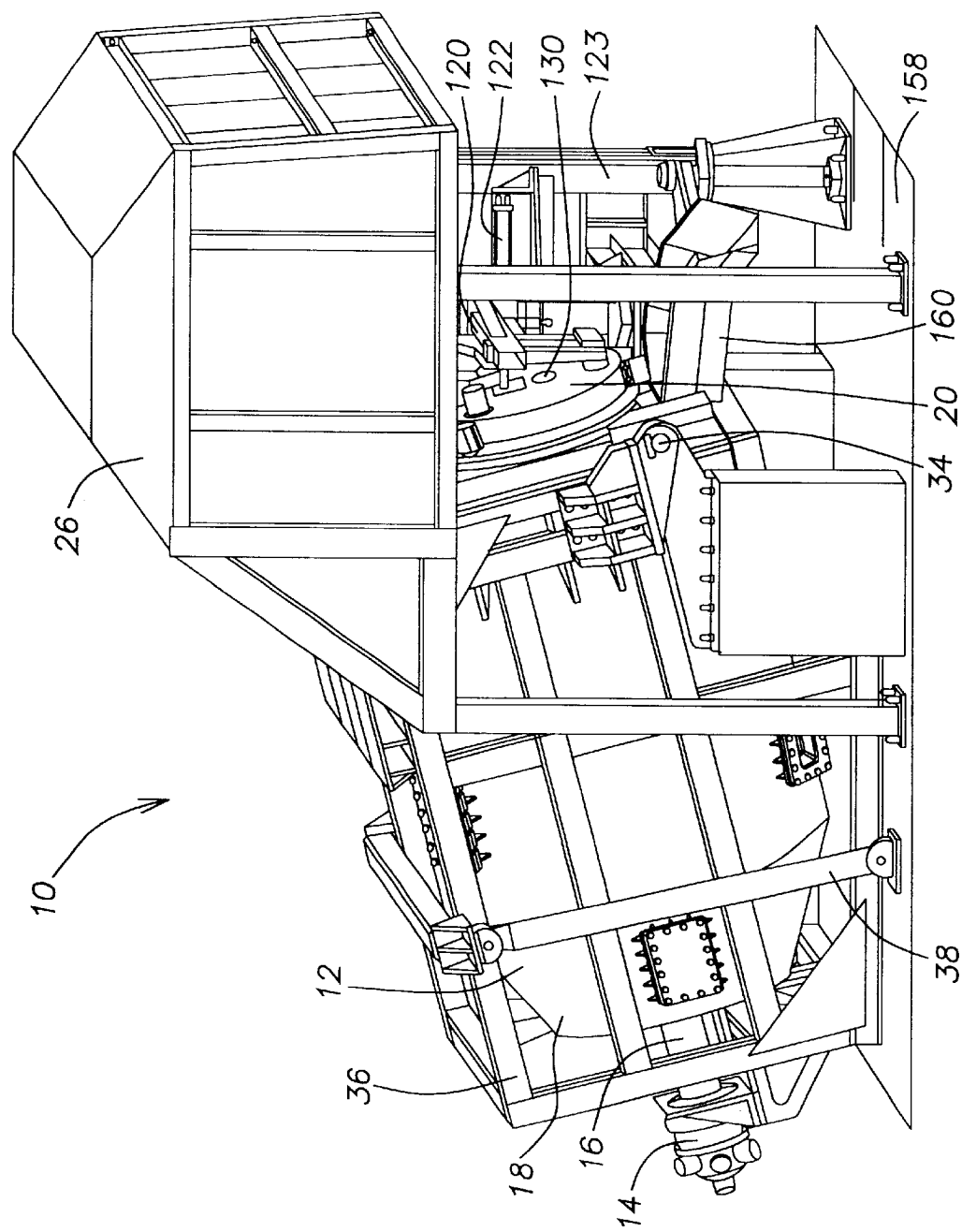
FIG. 2 is a perspective view of the tilting rotary furnace system.

Referring to FIGS. 1 and 2, a tilting rotary furnace system 10 according to the present invention is illustrated. The furnace system 10 has a furnace chamber 12, which is rotated about a longitudinal axis by a motor 14 via a direct drive unit 16, such as a planetary reducer. The drive unit 16 is axially connected to a first end 18 of the furnace chamber 12. The furnace system 10 has a door 20 for selectively covering an inlet passage 22 (FIG. 3) provided at a second end 24 of the furnace chamber 12. Disposed over and partially around the second end 24 of the furnace chamber 12 is an exhaust hood 26. The exhaust hood 26 is used to direct hot, rising gases emitted either from the inlet passage 22 or through the door 20, as will be described in more detail below. The furnace assembly 10 also has an oxy-fuel lance burner assembly 28, or other type of burner, for introducing heat energy into the furnace chamber 12. The burner assembly 28 is mounted adjacent the door 20 and a tip of the burner 28 traverses the door 20 through an opening to introduce heat energy into the furnace chamber 12.

Aluminum scrap (or dross) and flux are introduced into the furnace chamber 12 through the passage 22 using a charging unit 32 such as a conveyor or other loading machine, as is known in the art. The furnace system 10 is discharged, or unloaded in a decanting-type action, by tilting the first end 18 upwards about a pivot point 34 adjacent the second end 24 of the furnace chamber 12. The furnace chamber 12 is disposed within a frame 36. To tilt the first end 18 upwards, the furnace system 10 has at least one hydraulic lift 38 connected to the frame 36 to lift the frame 36, and the furnace chamber 12 contained therein, upward.

The furnace system 10 has a control unit 40 has a display 42 for controlling operation of the furnace system 10. Control functions include powering the motor 14 for rotation, monitoring the torque to rotate the rotating furnace chamber 12 as exerted by either the motor 14 or the drive unit 16, controlling the hydraulic lift 38, controlling the position of the door 20, controlling the firing of the burner 28, and controlling the charging unit 32. The foregoing furnace system 10 components and methods of operating the furnace system 10 will be described in greater detail below.

Referring to FIGS. 3 through 6, the furnace chamber 12 is shown in greater detail. It is noted that FIG. 4 illustrates an uncharged furnace chamber 12 while FIGS. 5 and 6 illustrate a charged furnace chamber. The furnace chamber 12 has a hollow interior area, or refractory chamber 46, defined by furnace chamber walls 48 where the aluminum scrap (or dross) is processed. The furnace chamber 12 has a generally cylindrical mid-section 50 disposed between a pair of oppositely oriented frustum-shaped end sections, or first end section 52 and second end section 54. The exterior of the furnace chamber 12 is generally circular at any cross-section taken across the longitudinal axis of the furnace chamber. However, the interior of the furnace chamber 12 has a polygonal cross-section of three to twelve sides. In the illustrated embodiment, the interior surface of the furnace chamber 12, in cross-section taken at any point across the longitudinal axis of the furnace chamber, has eight generally equal sides forming an octagon. Therefore, the interior of the furnace chamber 12 forms a plurality of generally flat surfaces, or facets 60. The facets 60 formed in the mid-section 50 and in the inlet passage 22 are generally square. The facets 60 located inside the first end section 52 and the second end section 54 are generally trapezoids which taper as they progress respectively from the mid-section 50 to the first end 18 and the second end 24. Alternatively, one skilled in the art will recognize that the interior surface of the furnace chamber 12 can have a generally circular cross-section taken at any point along the longitudinal axis of the furnace chamber 12.

With continued reference to FIGS. 3 through 6, the furnace chamber 12 has at least one paddle 62 radially projecting from the interior surface of the refractory chamber 46 towards the longitudinal axis of the furnace chamber 12. The paddles 62 strategically project about 30 to 50% of the distance from the interior surface of the walls 48 to the longitudinal axis of the furnace chamber 12. In one embodiment, the paddles 62 are formed as part of the interior surface of the walls 48. In the illustrated embodiment, however, passages 64 are formed through the walls 48 of the furnace chamber 12. In this embodiment, the paddles 62 extend through the passages 64 towards the longitudinal axis of the furnace chamber 12. An exterior end of each of the paddles 62 is provided with a flange 66 which is secured to an anchor 68 disposed on the exterior surface of the furnace chamber 12. The flange 66 and anchor 68 are bolted together using a plurality of bolts around the perimeter of the flange 66 and the anchor 68 to minimize movement of the paddles 62 with respect to the furnace chamber 12. To provide clearance for the bolts, the anchor 68 itself is provided with a flange supported by a plurality of fins.

One or more paddles 62 can be provided and are generally equally spaced around the circumference of the furnace chamber 12. In the illustrated example, three paddles 62 are provided and are strategically spaced apart by about 120 degrees. The paddles 62 are positioned around the mid-section 50 of the furnace chamber 12. In addition, the paddles 62 are positioned closer to the second end 24 than the first end 18 of the furnace chamber 12 such that the paddles 62 are located adjacent the second end section 54 as illustrated. Optionally, additional paddles can be provided on the first end section 52 and/or the second end section 54. By means of example, FIG. 3 illustrates (but not FIGS. 4–6) optional paddles 70 disposed through passages (not shown) through the first end section 52. The paddles 70 are offset from the paddles 68. For example, if the furnace chamber 12 is provided with three paddles 68 at the mid-section 50 and three paddles 70 at the first end section 52, the paddles 70 may be located approximately 60 degrees apart from the paddles 68. Other angular arrangements are also possible according to the invention. The paddles 62, in the illustrated embodiment, are shaped like broad, flattened blades. However, other paddle 62 shapes are intended to fall within the scope of the present invention. For example, the paddles 62 can be linear or non-linear, continuous or non-continuous, and can extend longitudinally beyond the mid-section 50 into the first end section 52 and/or the second end section 54. In addition, the paddles 62 can project from the internal surface of the furnace chamber 12 at an angle toward an interior region of the furnace chamber 12, rather than projecting radially.

With continued reference to FIGS. 3 through 6, the furnace chamber 12 is provided with a collar 72 adjacent the second end 24 of the furnace chamber 12. The collar 72 is secured to the furnace chamber 12 with a plurality of radial fins 74. As is known in the art, the furnace chamber is vertically supported by rollers (not shown) which engage a circumferential perimeter of the collar 72. Additional rollers may be used to prevent the furnace chamber from sliding backward when in the operating position illustrated in FIG. 2 or from sliding forward when the first end 18 is tilted upward to discharge the furnace chamber 12. The additional rollers are respectfully placed against front and rear surfaces of the collar 72. The furnace chamber 12 is supported at its first end 18 by the drive unit 16 which engages a recess 76 provided in the first end 18 of the furnace chamber 12. The motor 14 and the drive unit 16 are also supported by the frame 36 and tilt therewith.

The furnace chamber 12 is provided with an annular seal 90 surrounding the opening of the inlet passage 22 adjacent the second end 24. The seal 90 is provided with an annular channel 92. The channel 92 is defined by an exterior rim 94, a back wall 96, and interior rim 98. The exterior rim 94 provides a beveled rolling surface 100 used to engage rollers provided on the door 20, as will be described in more detail below. The channel 92, in cross-section, is trapezoidal shape with an open side to receive a corresponding trapezoidal projection disposed on the door 20, as discussed in more detail below.

The furnace chamber 12 is made from an external shell 102 of a material such as steel, iron, stainless steel or the like. The inside of the external shell 102 is provided with an internal shell 104 made from a material such as castable refractory lining or castable prefabricated bricks with a formulation to withstand high temperatures such as GREENKLEEN 60-PLUS available from A.P. Green Industries, Inc, or the like. The furnace chamber 12 can be strengthened with anchors (not shown) mounted to the inside of the exterior shell 102 as is known in the art. The internal shell is poured and cured in sections to obtain the polygon shape internal surface of the furnace chamber 12. The internal shell 104 is then coated with a castable refractory lining 106. The paddles 62 are made from metal such as cast iron or ceramic products and may be coated with a refractory lining 106.

Figure 8:
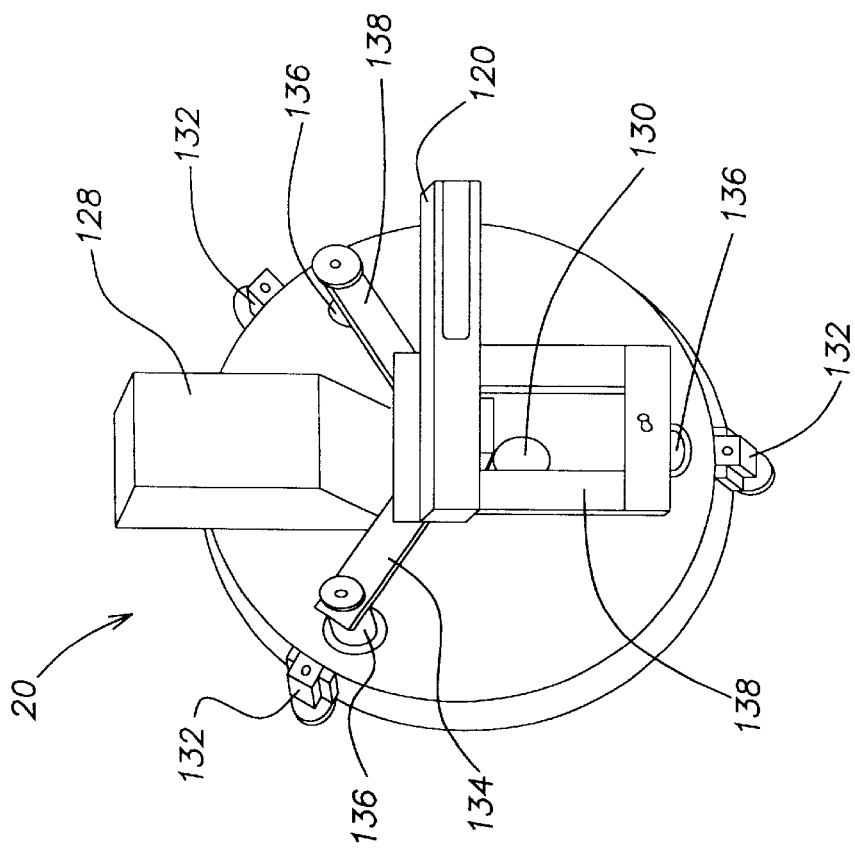
FIG. 8 is a perspective view of a front side of the furnace door.
Figure 7:
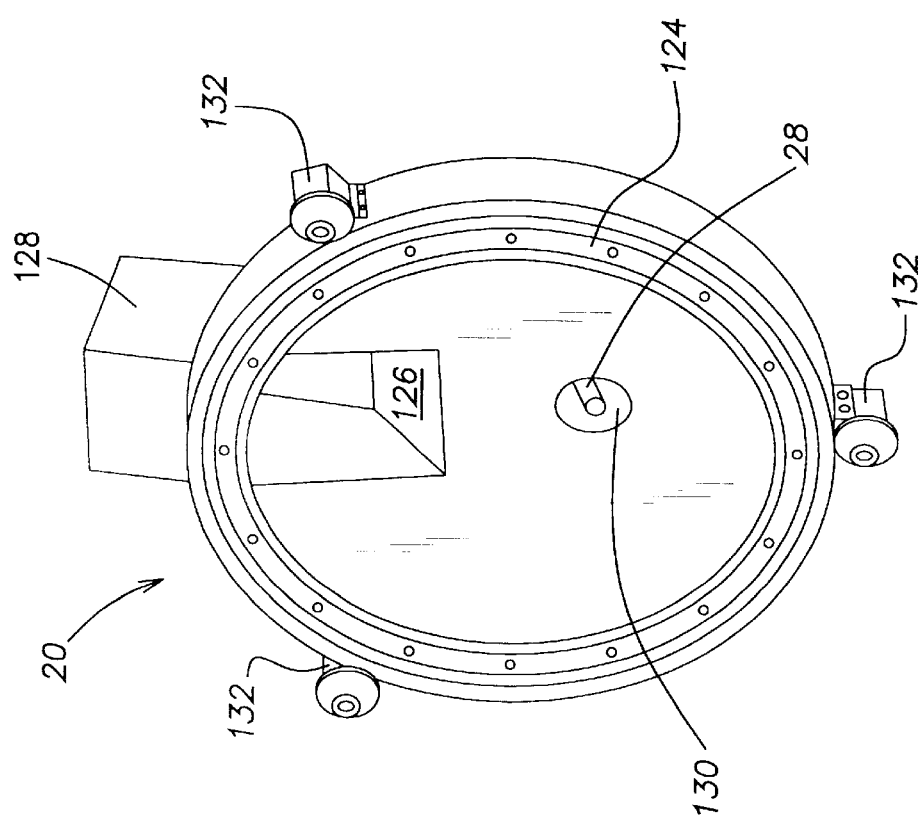
FIG. 7 is a perspective view of a rear side of a furnace door.

Referring now to FIGS. 1, 7 and 8, the door 20 is illustrated in greater detail. The door 20 has a closed position and an open position. The door is supported by an arm 120, or other support structure. The door 20 and arm 120 are actuated between the closed and open positions by a hydraulic cylinder 122 (FIG. 2). The arm 120 and the hydraulic cylinder 122 are pivotably connected to a stanchion 123. The door 20 has a front as illustrated in FIGS. 2 and 8 and a rear as illustrated in FIG. 7. In the closed position, the rear of the door 20 faces the refractory chamber 46. The rear of the door 20 is provided with a seal 124, which, when in the closed position, is received in the channel 92 of the seal 90 on the furnace chamber 12. Therefore, the seal 124 and the channel 122 have complementary shapes, such as the illustrated trapezoidal shape. The door 20 is provided with a flue opening 126 which allows gases to be vented from the refractory chamber 46. After gases pass through the flue opening 126, they are directed upward by a stack 128. The door 20 is also provided with a burner opening 130 through which the nozzle of the burner 28 projects in order to introduce heat energy into the refractory chamber 46. An exemplary burner 28 is an oxy-fuel lance burner which burns oxygen and natural gas, or other type of air and fossil fuel type burner. Suitable oxy-fuel lance burners are available from a number of sources, including Air Products and Chemicals, Inc. of Allentown, Pa., Linde Gas, Inc. of Laporte, Tex., and AGA Gas among others. The door 20 is provided with a plurality of trunnion and truss rollers 132. The rollers 132 are anchored to a periphery of the door 20 and have beveled wheels to engage the beveled rolling surface 100 of the seal 90 disposed on the second end 24 of the furnace chamber 12. The rollers 132 allow the furnace chamber 12 to rotate with respect to the door 20 while maintaining the door's closed relationship with the furnace chamber 12. The rollers 132 are positioned so that an air gap in one embodiment of from about 1/16 to about 1/2 inch and in one embodiment of about 1/8 inch is maintained between the surfaces of the seal 90 of the furnace chamber 12 and the surfaces of the seal 124 of the door 20.

To maintain the door 20 in the closed position and the rollers 132 firmly against the rolling surface 100, the door 20 is mounted to the arm 120 with a suspension 134. The suspension 134 includes a plurality of air springs 136 connected at one of their ends to the door 20 and at their other ends to beams 138. The beams 138, in turn, are connected to a central area on the arm 120. The beams 138 are rigid and are rigidly connected to the arm 120, but the air springs 136 will flex under pressure to allow the door 20 to self align and maintain its relationship with the furnace chamber 12 as the furnace chamber 12 and door 20 move during operation, and expand and contract due to thermal changes. One skilled in the art will recognize that other types of suspensions such as leaf springs, coil springs, hydraulic shock absorbers, pistons and the like, can be used with similar results and are intended to fall within the scope of the present invention. In the illustrated embodiment, three air springs 136 are provided adjacent a periphery of the door 20 and equally spaced apart by about 120 degrees. It is noted that two vertical beams and a horizontal beam connect the lower air spring 136 to the arm 120. This arrangement allows clear passage to the burner opening 130 so that the nozzle of the burner lance 28 can be easily introduced into the furnace chamber 12 through the door 20. In addition, the arm 120 can be connected to a center area of the door 20 with a central pivotable linkage.

Furnace Operation

Referring now to all of the figures, the operation of the furnace system 10 will be described in greater detail. Operation of the furnace system 10 begins with actuating the door 20 to the open position. As mentioned above, the door is opened and closed using the hydraulic member 122. The hydraulic member 122 is controlled by the control unit 40. After the door 20 has been opened the furnace chamber 12 is charged with a load of aluminum scrap (or dross) from which recovered aluminum is sought. Both scrap and dross contain considerable amounts of aluminum that can be recovered using the furnace system 10 according to the present invention. The scrap (or dross) is introduced into the furnace chamber 12 with the charging unit 32. Charging units are well known in the art and usually take the form of a conveyor type apparatus or container with an auger to move the material from a storage area into the refractory chamber 46 through the inlet passage 22. The charging unit 32 is adapted to move in to a loading position by mounting the charging unit 32 on a truck or rail assembly.

Once the furnace system 10 is charged with the aluminum containing material to be processed, flux is optionally introduced into the refractory chamber 46. The flux is typically in the form of salt, such as NaCl, KCl or a combination of thereof, and is intended to slow and inhibit oxidation of the melting aluminum. After the refractory chamber 46 has been charged with aluminum scrap (or dross) and, if used, flux has been added, the door 20 is actuated to its closed position adjacent the second end 24 of the furnace chamber 12 as described above. The aluminum scrap (or dross) and flux introduced into the furnace chamber 12 will collectively be referred to herein as charge material 148.

Next, the motor 14, under the control of the control unit 40, is started and rotates the furnace chamber via the drive unit 16. Alternatively, the motor 14 can start rotation of the furnace chamber 12 before charging to help distribute the charge material 148 as it is introduced into the furnace chamber 12. The motor 14 may be either an hydraulic motor or an electric motor. Alternatively, the motor 14 can be any other type of prime mover, such as an internal combustion engine. Torque exerted by the motor 14 and/or drive unit 16 to rotate the rotating furnace chamber 12 and its contents is monitored by measuring hydraulic pressure in the case of a hydraulic motor 14, or monitored by measuring electric current if an electric motor 14 is used. For illustrative purposes, the motor 14 used in the following discussion and examples is an hydraulic motor 14 and torque is measured as a function of hydraulic pressure. The hydraulic pressure can be measured either in the motor 14 or in the drive unit 16.

After the furnace chamber 12 has been charged and the door 20 has been closed, the nozzle of the burner 28 is introduced into the furnace chamber 12 through the burner opening 130 in the door 20 and the control unit 40 directs the burner 28 to commence firing. The motor 14 rotates the furnace chamber 12 in a clockwise direction from the perspective of one facing the first end 18 of the furnace chamber. Alternatively, the motor 14 can rotate the furnace chamber 12 in a counterclockwise direction. A flame 150 is expelled from the burner 28 into the refractory chamber 46 in a direction and orientation to take advantage of the rotation of the furnace chamber 12 and the interior geometry of the refractory chamber 46. The flame 150, as illustrated in FIG. 6 (the burner 28 is shown in broken lines), is for a clockwise rotating furnace chamber 12 when viewed from the first end 18, and which is a counterclockwise rotating furnace chamber when viewing the second end 24 of the furnace chamber 12. One skilled in the art will appreciate that if the furnace chamber 12 is rotated in the opposite direction, the flame direction and heat patterns described below will be a mirror image of those described.

The door 20 assists in holding and orienting the burner 28. The burner 28 may also be held by a connection to the stanchion 123. The door 20 also helps to regulate the atmosphere in the furnace chamber 12. More specifically, the door reduces the free air and amount of oxygen in the refractory chamber 46 below that which would otherwise be introduced in a doorless furnace system. Since little oxygen is present, aluminum oxide is less likely to form and the amount of flux can be reduced. In one embodiment, the burner opening 130 is located in approximately the center of the door 20. However, in order to achieve the heat radiation pattern described below, the burner opening 130 can be positioned at any point on the door 20 in order to provide the desired angle and point of introduction of the flame 150. For example, the opening can be located approximately half way between the left hand most point on the door and the center of the door. The tip of the burner 28 is inserted into the furnace chamber 12 a distance ranging from being even with or adjacent the door to the longitudinal center of the furnace chamber 12. In one embodiment, the burner 28 traverses the inlet passage 22 so that the tip of the burner is located in the second end section 54 of the furnace chamber 12.

The heat and hot gases generated by the flame 150 travels generally along the path 152 illustrated in FIGS. 5 and 6 as they circulate through the refractory chamber 46. Accordingly, the burner 28 and flame 150 are introduced into the refractory chamber 46 through the inlet passage 22 at an angle to the longitudinal axis of the furnace chamber 12. The angle chosen may depend on the location of the opening 130 and the distance the tip of the burner 28 is inserted into the furnace chamber 12. In one embodiment, the angle is 0 to 45 degrees, and in one embodiment the angle is 10 to 30 degrees from the longitudinal axis of the furnace chamber 12. If the burner opening 130 is moved from the center of the door 20 to the left, a smaller angle of introduction of the flame 150 may be selected. Comparing the rear wall 154 to the face of a clock, the lance of the burner 28 may be inserted through the burner opening 130 in the door 20 and targeted towards an area where the rear wall 154 meets the first end section 52 between about 9 o'clock and 11 o'clock.

The heat radiated from the flame 150 tends to reflect off of the facets 60 of surfaces on the interior of the second end section 54 and the mid-section 50. As the heat and hot gases progress towards the first end section 52 of the furnace chamber 12, the heat/hot gases tend to wrap around the back of the furnace chamber 12 and reflect off the rear wall 154 of the furnace chamber 12. As indicated by the path 152 in FIG. 6, the heat then reflects off of the faceted surfaces of the opposite side of the furnace and progresses back towards the inlet passage opening 22. As the radiated heat progresses towards the door 20 it will have a tendency to rise and pass through the flue opening 126 where it is vented from the furnace chamber 12 through the stack 128. It has been found that by reflecting the heat generated by the flame 150 off of the faceted, geometric surfaces in the refractory chamber 46, the flame 150 and heat tends to provide a relatively homogenous heat bath, for example providing a relatively homogeneous gradient, at a top surface 156 of the charge material 148. The heat bath temperature distribution is generally even across the top surface 156 of the charge material 148. This is a result of the flame 150 being introduced roughly parallel to a ground surface 158 (FIG. 2) and then being subsequent reflected off of the interior surfaces of the refractory chamber 46 to inhibit rising of the heat to the top of the refractory chamber 46. It is noted that the top surface 156 of the charge material 148 will also be roughly parallel to the ground surface 158, whether the charge material 148 is in a solid state, a plastic mode, a near molten mode, or a molten state. As the heat moves throughout the refractory chamber 46, the interior planar surfaces of the refractory chamber 46 reflect the heat to keep it and the hot gases adjacent the top surface 156, thereby heating the charge material 148. Radiative heat transfer from the flame 150 and radiative and other heat transfer from hot gases may account for a substantial portion of the heat transferred to the charge material 148, for example, on the order of about 95%. The internal surface of the furnace chamber 12 also will have a tendency to become heated by the flame 150. This is especially true in the areas adjacent the flame 150 at the left side of the furnace chamber when viewed from the second end 24. Since the furnace chamber rotates in a counterclockwise direction when viewed form the second end 24, the heated area of the furnace chamber 12 is turned to become in contact with part of the charge material 148, thereby introducing additional heat into the charge material 148. Radiative heat transfer and other heat transfer from the hot walls to the charge material 148 may account for about 5% of the heat transferred to the charge material 148.

Figure 9:
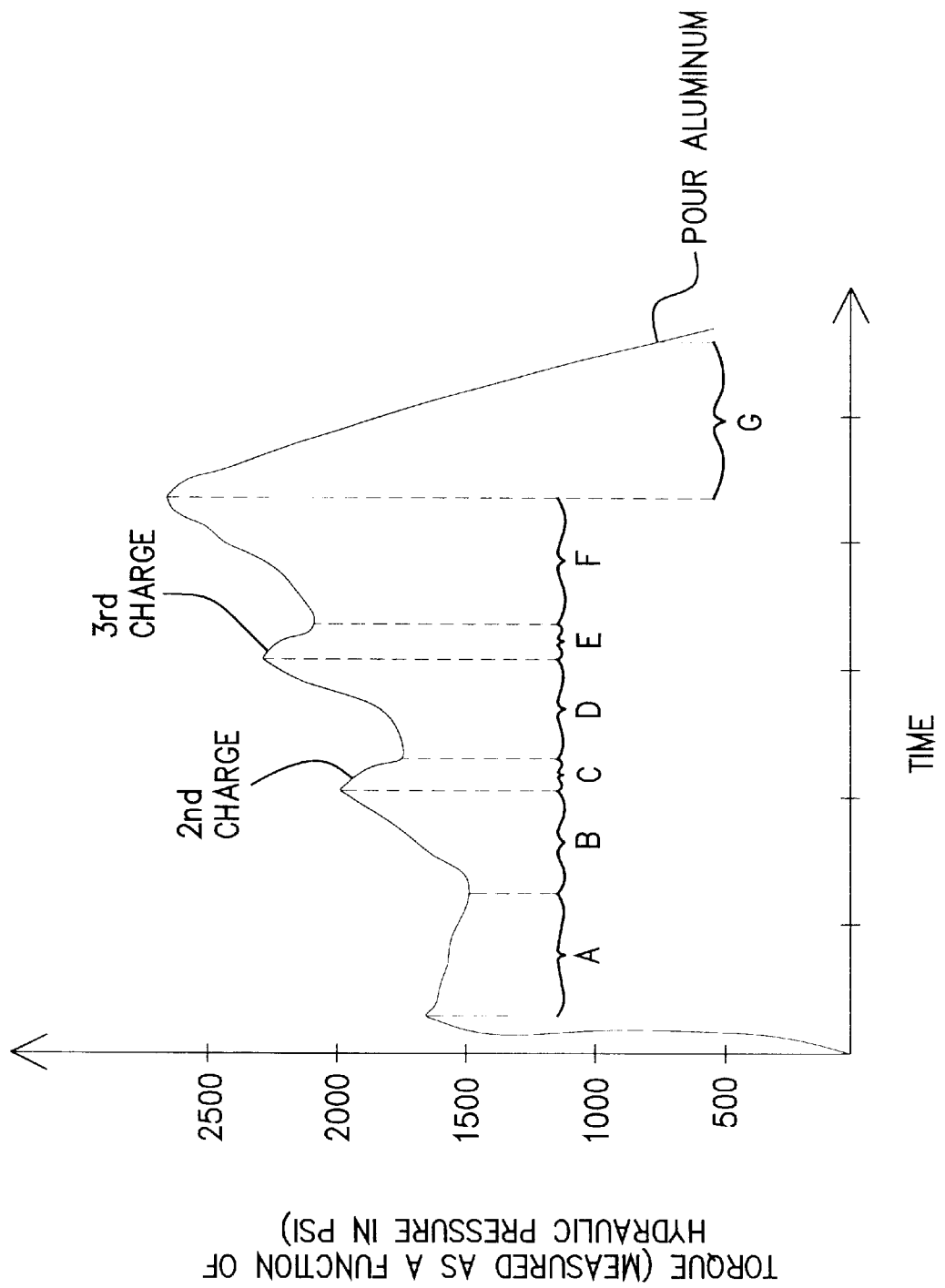
FIG. 9 is a graph representing torque versus time used in operating the furnace system according to the present invention.

Referring to FIG. 9, as the motor 14 rotates the furnace chamber 12, the torque to rotate the furnace chamber 12 increases rapidly until the furnace chamber 12 rotates at a desired, constant speed. In one embodiment, the desired speed is about 0 to 15 revolutions per minute and in one embodiment the desired speed is about 5 to 12 revolutions per minute. Once the desired rotational speed of the furnace chamber is reached, it is held generally constant by the motor 14 and the drive unit 16. In this state, before the charge material 148 begins to melt, the torque falls off slightly as indicated in region A on the graph in FIG. 9. However, as the aluminum in the charge material 148 starts to melt and become plastic, the charge material 148 tends to stick to the interior walls of the furnace chamber 12 and to the paddles 62, and is carried upward with the rotating furnace chamber 12. This increases the torque as indicated by region B on the graph in FIG. 9. As additional heat is introduced, the aluminum tends to become less viscous and does not stick as much to the interior surfaces of the furnace chamber 12. Therefore, the torque developed by the motor 14 and drive unit 16 begins to decrease as illustrated in region C of FIG. 9. It should be apparent that the measured torque is providing an indication of charge material 148 viscosity. It should also be apparent that regardless of the make-up or quantity of the aluminum scrap (or dross), it will be possible to determine whether the charged material 148 is flowable.

The graph of torque versus time as illustrated in FIG. 9 is presented to an operator on the display 42 of the control unit 40. When the operator sees that the torque begins to decrease, which occurs as a result of the aluminum becoming less viscous, for example, in a near molten mode (region C), or when software in the control unit detects this state, it is an indication that the furnace system 10 is ready for the second charge. Therefore, the burner 28 is turned off (if it is not already turned off as discussed below), the door 20 is opened and the rotation of the furnace chamber 12 is optionally stopped. Then the furnace chamber 12 is charged with the second charge of aluminum scrap (or dross) and, if used, flux. The rotation of the furnace chamber 12, if stopped, is restarted, the door 20 is closed and the burner 28 is turned back on. For a brief period of time, the torque will continue to decrease until the material in the second charge starts to become plastic and to adhere to the interior surfaces of the furnace chamber 12. At that time, or region D as illustrated in FIG. 9, the torque will increase until the charge material 148 again becomes less viscous, e.g., in a near molten state. When this occurs, or region E as illustrated in FIG. 9, the torque will again decrease and indicate the change in state of the charge material. When the operator or programming of the control unit 40 determines that the charge material 148 has reached this flowable state, the furnace is charged a third time in the same manner as the second charge. Similar to the events happening after the second charge, the torque will decrease until the material in the third charge becomes plastic and adheres to the internal surfaces of the furnace chamber 12, at which point the torque will increase as indicated by region F in FIG. 9.

After the charge material 148 has become less viscous and more flowable in a near molten state, the torque tends to decrease as shown in region G of FIG. 9. The furnace system 10 is allowed to continue to operate until the operator or programming in the control unit is sufficiently satisfied that the aluminum is in a pourable state. At this point, the burner is turned off (if it is not already turned off as discussed below), the door 20 is opened and the first end 18 of the furnace chamber 12 is tilted upward so that the molten aluminum pours through the inlet passage 22 and out of the furnace chamber 12 into a recovery container. The geometry of the furnace chamber 12 acts as a decanter such that the metal is poured while a vast majority of the slag floats and is temporarily trapped in the refractory chamber 46. It is noted that a trough 160 (FIG. 2) can be used to help direct the molten aluminum. While the molten aluminum is being poured, the furnace chamber 12 is optionally rotated. In addition, an operator using a rake can optionally help hold slag in the refractory chamber 48 while the aluminum is being poured, as is well known in the art. After the molten aluminum has been poured out of the furnace chamber 12, the slag is removed from the furnace chamber by further tilting the first end 18 of the furnace chamber 12 upwards and rotating the furnace chamber 12. To assist in removing the slag the furnace chamber 12 can be rotated in alternating directions and the speed of rotation can be increased.

The paddles 62 are used to mix and agitate the charge material 148. The paddles 62 have various effects on the charge material 148 depending on which stage of operation (e.g., regions A–G in FIG. 9) the furnace system 10 is in. During the time period relating to region A, the paddles 62 mix the aluminum scrap (or dross) and the flux material. It is noted that the geometric shaped surfaces of the refractory chamber 46 also assist in mixing and agitating the charge material 148 during all stages of operation. As the aluminum begins to melt during period B, salt slag and oxidized aluminum, or aluminum oxide ($AlO_2$ and/or $ALO_3$), begin to rise to the top of the charge material 148. The salt slag and the aluminum oxide are thermal insulators which will reduce the amount of heat transferred to the unmelted and plastic aluminum located under the top surface 156 where the salt slag and aluminum oxide have formed a covering layer. As the furnace chamber 12 rotates, however, the paddles 62 will engage the top surface 156, breaking up and pushing down portions of the slag material and aluminum oxide formed at the top surface 156. By breaking up and submerging portions of the slag and aluminum oxide, better heat transfer into the aluminum contained in the charge material 148 can be accomplished. An additional benefit is gained from submerging aluminum oxide as it is forming. The production of aluminum oxide from aluminum and oxygen is an exothermic reaction. Although the production of aluminum oxide is generally not desired as it lowers the amount of recovered aluminum, some aluminum oxide is bound to form and the heat generated by this exothermic reaction can be used to help melt unmelted aluminum in the charge material 148 and increase the temperature of the charge material 148 as a whole. It is recognized that much of the heat generated in the production of aluminum oxide will escape from the furnace chamber 12 through the flue opening 126, but at least a portion of the heat given off by this reaction may be harnessed by breaking up and submerging the aluminum oxide by the paddles 62. In addition, this submerging action assists to control the formation of additional aluminum oxide since the charge material 148 will act as a heat sink drawing heat from aluminum that may be approaching the point of oxidizing.

After the charge material 148 becomes flowable in period C, the furnace system 10 is charged with another load of aluminum scrap (or dross) and flux. Solids 162 contained in the second charge will have a tendency to float at the top surface 156 of the charge material 148. During periods C and D, voids will temporarily form behind the paddles 62 as the paddles 62 engage and turn through the charge material 148 as a result of their rotation. The solids 162 will have a tendency to fall into the voids and become submerged in the charge material 148 when the voids fill with flowable charge material. The paddles 62 will also have a tendency to push solids 162 located in their path under the top surface 156 of the charge material 148. By submerging the solids 162, the already flowable charge material 148 can contact more surface area on the solids 162 and the solids 162 will act as a heat sink, thereby conducting heat energy from the charge material and melting more rapidly. Additionally, during periods D and F of the furnace operation, the paddles 62 act as they did during period B. During period E, the paddles act as they did during period C. Another reason for submerging solids 162 is to minimize exposure of the solids 162 to the flame 150 and to oxygen. The overall result of the paddles is to decrease the melt cycle time, lower the amount of flux required to protect the aluminum from oxidizing and increase the percentage of aluminum recovered.

As mentioned above, the control unit 40 controls the firing of the burner 28. The control of the burner 28 is a programmable feature. The control unit 40 controls the quantity of fuel burned, the oxygen/fuel ratio, and the rate the oxygen and fuel are supplied to the burner 28. The quantity of fuel provided to the burner 28 is in direct correlation to the energy consumed by the furnace system 10. Therefore, computer modeling supplemented with actual performance results of the furnace system 10 is used to establish a set of energy consumption baselines per ton of material processed. Alternatively, past performance results are used to derive the energy consumption baselines per ton of material processed, without the assistance of computer modeling. This knowledge is used to develop a look-up table to indicate how much energy will be required to successfully process a given quantity of aluminum scrap (or dross) and a given quantity of flux. This allows the operator to specify the amount (e.g., weight) of scrap (or dross) and the amount of flux, plus the nature of the scrap or dross (e.g., painted or oily scrap, and the scrap source, such as engine blocks or beverage containers) to determine the amount of energy required. Upon inputting this information for each charge of the furnace system 10, the control unit will determine how much fuel should be supplied to the burner 28 and at what rate. Once the predetermined amount of fuel has been supplied to the burner 28, the control unit 40 will suspend supply of fuel to the burner 28 since the amount of energy introduced into the furnace chamber 12 should be adequate to sufficiently melt the aluminum scrap (or dross). In general, it takes 450 to 600 btu per pound of aluminum scrap (or dross) to convert the aluminum contained therein to molten material. Using natural gas as the fuel supply to the burner 28, it will take approximately 20 to 35 cubic meters of natural gas per metric ton of aluminum scrap (or dross) and flux introduced into the furnace chamber 12 at a rate of about 100 to 160 m$^3$ of fuel per hour to process the charge material 148. The oxygen to fuel ratio in one embodiment is about 1.8:1 to 2.2:1, with about 2:1 being stoicheometric. Once the aluminum is in a flowable state, or about 1,325° F., it is poured from the furnace chamber 12. At this temperature, the aluminum is flowable and silver in color. By suspending the introduction of additional energy into the furnace chamber 12, the aluminum can be kept from becoming too hot, for example, about 1,420° F. This helps minimize reaction of the aluminum with any iron present in the charge material 148, minimize oxidation of the aluminum and reduce the fuel required to process the aluminum scrap (or dross).

It is noted that no temperature measurement of the charge material 148 or furnace chamber 12 is necessary for use in the control of normal furnace system 10 operation. However, some temperature measurements may be made to monitor for an overheating condition, such as measuring the temperature of the gases vented through the stack 128. In addition, no visual assessment of the charge material 148 is necessary in the furnace system 10 according to the present invention. The control unit monitors and regulates the furnace system 10 by torque feedback provided from either the motor 14 or drive unit 16 as an indication of charge material 148 viscosity and feedback of the quantity of fuel burned by the burner 28. These two conditions are sufficient to process the aluminum scrap (or dross) into recovered molten aluminum separated from slag, waste dross and ferrous materials that were contained in the original charge material 148. Accordingly, the control unit 40 is provided with the display 42 for providing the operator information such as the torque generated by furnace system 12 and the amount of fuel consumed. Optionally, the control unit 40 can be provided with a microprocessor for automating many of the control features described above. Control unit 40 is also provided with switches and other actuators to control the motor 14, the drive unit 16, the hydraulic lift 38, the door 20, the burner 28, and the charging unit 32.

EXAMPLES

A furnace system constructed in accordance with the illustrated embodiment can be approximately 93% energy efficient. The efficiency is achieved by the combined functioning of the paddles 62, door 20, burner 28, furnace chamber 12 and associated control system. The furnace system also uses less flux and fuel to recover more metal than a traditional fixed axis furnace as indicated by the following table.

TABLE 1

|  | Traditional Fixed Axis Furnace System | Tilting Furnace System 10 |
|---|---|---|
| Capacity (metric tons) | 20 | 9 |
| Salt Factor (i.e., flux) | 1.2 | 0.5 |
| Tap-to-Tap Time (hours) | 6 | 3 |
| Energy Consumption (kWh per metric ton) | 1100 | 400 |
| Input: scrap or dross (metric tons) | 13.6 | 7.6 |
| Input: salt/flux (metric tons) | 6.4 | 1.4 |
| Output: metal (metric tons) | 8.3 | 4.9 |
| Output: slag (metric tons) | 11.4 | 4.1 |
| Recovered Metal Production (metric tons per day) | 33 | 39 |

A nine metric ton capacity furnace system 10 made in accordance with the illustrated embodiment can process about 7.6 metric tons of scrap and 1.4 metric tons of flux into about 4.9 metric tons of recovered metal and 4.1 metric tons of slag in a time period of about two to three hours (i.e., a melt rate of about 3 to 4.5 metric tons per hour).

The following table shows repeatable production results for eight trial runs of a nine metric ton capacity furnace system 10 according to the present invention. It is noted that trial runs 1–3 and 6–8 involve melting three charges of aluminum scrap. Trial runs 4 and 5 involve melting three charges of dross containing aluminum. Disregarding trial runs 4 and 5, the average consumption of natural gas (N.G.) per run is 237 m$^3$ and the average recovery of aluminum is 75.27%, by weight, of the aluminum scrap loaded into the furnace chamber 12.

TABLE 2

| Trial Run No. | Total Flux Charged (Kg.) | Total Aluminum Scrap or Dross Charged (Kg.) | Weight of Aluminum Recovered (Kg.) | Percent of Aluminum Scrap or Dross Recovered as Aluminum | Weight of Slag Recovered (Kg.) | Total N.G. Fuel Used (m$^3$) | Cycle Time (Hrs.) |
|---|---|---|---|---|---|---|---|
| 1 | 1000 | 7010 | 4790 | 68.33% | 3050 | 241 | 3 |
| 2 | 1130 | 8160 | 6490 | 79.55% | 2750 | 289 | 3.5 |
| 3 | 1120 | 8370 | 6362 | 76.00% | 1950 | 255 | 2.5 |
| 4 | 880 | 8130 | 3870 | 47.60% | 5400 | 264 | 4 |
| 5 | 1460 | 7600 | 2980 | 39.69% | 6290 | 313 | 3.83 |
| 6 | 960 | 7970 | 5590 | 70.14% | 2820 | 218 | 2.66 |
| 7 | 950 | 7680 | 6170 | 80.33% | 2470 | 225 | 2.7 |

TABLE 2-continued

| Trial Run No. | Total Flux Charged (Kg.) | Total Aluminum Scrap or Dross Charged (Kg.) | Weight of Aluminum Recovered (Kg.) | Percent of Aluminum Scrap or Dross Recovered as Aluminum | Weight of Slag Recovered (Kg.) | Total N.G. Fuel Used (m$^3$) | Cycle Time (Hrs.) |
|---|---|---|---|---|---|---|---|
| 8 | 1020 | 7880 | 6028 | 76.00% | 2910 | 198 | 2.66 |
| Avg. | 1065 | 7850 | 5285 | 67.32% | 3455 | 250.4 | 2.92 |

For additional illustration of the operation of the furnace system 12, trial run number 3 will be discussed in greater detail. During trial run number 3, 3210 Kg of aluminum scrap is initially charged into the furnace chamber 12 (i.e., first charge). No flux is charged into the furnace chamber 12 in the first charge. The door 20 is closed and the burner 28 was run for 40 minutes at a rate of 130 m$^3$ of natural gas per hour. Once the hydraulic pressure/torque measurement indicates that the first charge is about to become molten, the door 20 is opened and a second charge of 2420 Kg of aluminum scrap and 570 Kg of flux is introduced into the furnace chamber 12. The door 20 is closed and the burner 28 run for 20 minutes at a rate of 140 m$^3$ of natural gas per hour. Again, once the hydraulic pressure/torque measurement indicates that the charge material 148 from the first and second charges is about to become molten, the door 20 is opened and a third charge of 3170 Kg of aluminum scrap and 550 Kg of flux is introduced into the furnace chamber 12. The door is closed and the burner 28 is run at a rate of 140 m$^3$ per hour to consume an additional 121.66 m$^3$ of natural gas for a total of 255 m$^3$ of natural gas consumed during the trial run. Once the hydraulic pressure/torque measurement indicates that the charge material 148 is sufficiently molten, the metal to be recovered is discharged. The waste material containing salt cake, slag and dross is subsequently discharged.

Although particular embodiments of the invention have been described in detail, it is understood that the invention is not limited correspondingly in scope, but includes all changes, modifications and equivalents coming within the spirit and terms of the claims appended hereto.

What is claimed is:

1. A furnace system for recovering a non-ferrous metal from a charge of material containing the metal, comprising:
   a furnace chamber having walls defining a refractory chamber, the refractory chamber receiving the charge of material and the metal contained in the charge of material being heated in the refractory chamber;
   a drive system coupled to the furnace chamber and rotating the furnace chamber about a longitudinal axis; and
   a control unit including a means for receiving a signal indicative of torque used to rotate the furnace chamber, the torque being a function of viscosity of the charge of material, and a means for utilizing the signal indicative of torque to generate an indication that the charge of material has reached a sufficiently flowable mode for recovery.

2. The furnace system according to claim 1, wherein the drive system includes a drive unit for coupling a motor to the furnace chamber, the drive unit axially connected to the furnace chamber.

3. The furnace system according to claim 1, wherein the drive system has a hydraulic motor and torque is measured as a function of hydraulic pressure.

4. The furnace system according to claim 1, wherein the drive system has an electric motor and torque is measured as a function of electrical current supplied to the motor.

5. The furnace system according to claim 1, further comprising a burner for introducing a flame into the refractory chamber, the control unit regulating an amount of fuel supplied to the burner, the amount of fuel being predetermine based on a quantity of charge of material.

6. The furnace system according to claim 1, wherein the interior surface of the furnace chamber forms a polygon when taken in cross-section along the longitudinal axis of the furnace chamber.

7. The furnace system according to claim 6, wherein the walls of the furnace chamber comprise a rear wall, a first frustum shaped end section connected to the rear wall, a second frustum shaped end section and a cylindrical mid-section disposed between and connecting the end sections, ends of the end sections proximal the mid-section having a larger radius than ends of the end sections distal the mid-section.

8. The furnace system according to claim 7, further comprising a burner for introducing a flame into the furnace chamber at an angle from the longitudinal axis of the furnace chamber, wherein heat generated by the flame is reflected off of the interior surfaces of the furnace chamber walls to provide a heat bath disposed adjacent a top surface of the charge of material.

9. The furnace system according to claim 7, wherein at least one paddle projects from an interior surface of the mid-section toward the longitudinal axis of the furnace chamber.

10. The furnace system according to claim 9, wherein there are three paddles, the paddles being spaced apart by about 120 degrees.

11. The furnace system according to claim 1, further comprising a door having a closed position adjacent an inlet passage defined by the walls of the furnace chamber and an open position to provide access to the inlet passage.

12. The furnace system according to claim 1, further comprising a door having a closed position adjacent an inlet passage defined by the walls of the furnace chamber and an open position to provide access to the inlet passage, the door having a plurality of rollers engaging a rolling surface disposed on the furnace chamber adjacent the inlet passage, the door coupled to a support structure with a suspension, the rollers and suspension maintaining the door in a closed position during operation of the furnace system.

\* \* \* \* \*

UNITED STATES PATENT AND TRADEMARK OFFICE
CERTIFICATE OF CORRECTION

PATENT NO.    : 6,395,221 B1
DATED         : May 28, 2002
INVENTOR(S)   : Moshe Yerushalmi It is certified that error appears in the above-identified patent and that said Letters Patent is hereby corrected as shown below:

<u>Title page,</u>
Item [*], Notice, please delete "This patent issued on a continued prosecution application filed under 37 CFR 1.53 (d), and is subject to the twenty year patent term provisions of 35 U.S.C. 154 (a) (2)."

Signed and Sealed this

Twenty-ninth Day of October, 2002

Attest:

Attesting Officer

JAMES E. ROGAN
*Director of the United States Patent and Trademark Office*